(12) United States Patent
Andrews et al.

(10) Patent No.: US 8,784,712 B2
(45) Date of Patent: *Jul. 22, 2014

(54) PRECISION POLYURETHANE MANUFACTURE

(75) Inventors: Geoffrey Thomas Andrews, Cambridge (GB); Anthony Francis Johnson, Ilkley (GB)

(73) Assignee: Ranier Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/343,693

(22) PCT Filed: Jul. 30, 2001

(86) PCT No.: PCT/GB01/03441
§ 371 (c)(1),
(2), (4) Date: Aug. 12, 2003

(87) PCT Pub. No.: WO02/11975
PCT Pub. Date: Feb. 14, 2002

(65) Prior Publication Data
US 2004/0049002 A1    Mar. 11, 2004

(51) Int. Cl.
*B29C 47/78* (2006.01)
*B29C 45/00* (2006.01)
*B29C 67/24* (2006.01)

(52) U.S. Cl.
USPC .......... 264/211.24; 264/40.7; 264/210.2; 264/210.6; 264/211; 264/211.12; 264/328.17; 264/328.18; 264/328.6; 264/331.19

(58) Field of Classification Search
None
See application file for complete search history.

(56) References Cited

U.S. PATENT DOCUMENTS

| 3,296,043 | A | * | 1/1967 | Fluke et al. ............... 149/19.92 |
| 3,642,964 | A |   | 2/1972 | Rausch et al. |
| 4,250,292 | A | * | 2/1981 | Niederdellmann et al. .... 528/44 |
| 4,597,927 | A | * | 7/1986 | Zeitler et al. .................... 264/85 |
| 4,984,859 | A | * | 1/1991 | Fujigaki et al. ............... 385/114 |
| 5,464,585 | A | * | 11/1995 | Fitzgibbon .................... 264/108 |
| 5,545,707 | A | * | 8/1996 | Heidingsfeld et al. .......... 528/60 |
| 5,628,944 | A | * | 5/1997 | Nagasaka et al. ............ 264/46.9 |

(Continued)

FOREIGN PATENT DOCUMENTS

| DE | 2302564 | 7/1974 |
| DE | 2549372 | 5/1977 |

(Continued)

OTHER PUBLICATIONS

Broadhead T., et al., "Closed Loop Viscosity Control of Reactive Extrusion with an In-Linerheometer", Polymer Engineering & Science, Society of Plastics Engineers, US, vol. 36, No. 23 (1996) 2840-2851.

(Continued)

*Primary Examiner* — Jeffrey Wollschlager
(74) *Attorney, Agent, or Firm* — Wolf, Greenfield & Sacks, P.C.

(57) ABSTRACT

A process for making a polyurethane, comprising reacting a multifunctional isocyanate, a polyol and, optionally, a chain extender, wherein at least two reagents selected from the isocyanate, the polyol, the chain extender, any mixture thereof and any pre-polymer formed therefrom, are intensively mixed prior to being reactively extruded, to form a polyurethane having a predetermined stoichiometry and thermal history. The polyurethanes obtained by such a process are of highly consistent composition and are, thus, especially suitable for use in the medical device industry.

10 Claims, 3 Drawing Sheets

(56) References Cited

U.S. PATENT DOCUMENTS

| | | | |
|---|---|---|---|
| 5,750,909 A | | 5/1998 | Hawkins et al. |
| 5,795,948 A | * | 8/1998 | Heidingsfeld et al. ........... 528/59 |
| 5,968,091 A | * | 10/1999 | Pinchuk et al. .............. 623/1.16 |
| 6,254,813 B1 | * | 7/2001 | Eckardt et al. ................... 264/39 |
| 6,294,637 B1 | * | 9/2001 | Brauer et al. .................... 528/61 |
| 6,417,312 B1 | * | 7/2002 | Kirchmeyer et al. ........... 528/59 |
| 2006/0167550 A1 | * | 7/2006 | Snell et al. ................. 623/17.13 |
| 2007/0043443 A1 | | 2/2007 | Snell et al. |
| 2007/0050037 A1 | | 3/2007 | Snell et al. |
| 2007/0050038 A1 | | 3/2007 | Snell et al. |

FOREIGN PATENT DOCUMENTS

| | | |
|---|---|---|
| DE | 2610980 | 9/1977 |
| EP | 0644025 | 3/1995 |
| GB | 1403693 | 8/1975 |
| GB | 2331717 A | 6/1999 |
| JP | 02032111 | 2/1990 |
| WO | WO 8100259 | 2/1981 |
| WO | WO 0055225 | 9/2000 |

OTHER PUBLICATIONS

Janssen, L., "On the Stability of Reactive Extrusion", Polymer Engineering & Science, Society of Plastics Engineers, US, vol. 38, No. 12 (1998) 2010-2019.

Schonfeld, S., et al., "Zweiwellenaxtruder—Wirtschaftlich Beim Raktiven Aufbereiten", Kunststoffe, Carl Hanser Verlag. Munchen, DE, vol. 83, No. 10 (1994) 1308-1310, 1312.

Unterberger, M., et al., "Produktionsparameter Beim Rrim-Prozess Kontinuierlich Ueberwachen", Kunststoffe, Carl Hanser Verlag. Munchen, DE, vol. 80, No. 8 (1990) 877-879.

International Search Report, from PCT/GB01/03441, mailed Jun. 11, 2001.

Written Opinion, from PCT/GB01/03441, mailed Jul. 19, 2002.

Coates et al., "Some Routes for Tailoring of Polymer Properties Through Processing", *Trans IChemE*, 73(A):753-770 (Sep. 1995).

* cited by examiner

PRECISION POLYURETHANE MANUFACTURE

FIELD OF INVENTION

The present invention relates to a process and apparatus for the manufacture of polymers with a high degree of precision and reproducibility, as well as to the polymers produced thereby. In particular, the invention relates to polyurethanes produced by precision polyurethane manufacture (PM), which have a high degree of consistency and are suitable for use in the medical product industry.

BACKGROUND OF INVENTION

Since their original development by Professor Otto Bayer, polyurethanes have become widely used in a range of different applications, such as in the footwear, construction, textile and automotive industries. Of particular interest, however, is the use of polyurethanes in the medical product industry. In this field alone, the range of applications is extensive and includes, for example, artificial heart components, wound dressing products and catheters, to mention but a few. Further new areas of application are also under development, such as, for example, replacement joints and vertebrae. The biomedical field imposes particularly stringent requirements in general on any synthetic materials intended for inclusion in medical devices and polyurethanes are no exception. For example, the difficulties caused by build-up of deposits on polyurethane catheters, fatigue failure of heart valves and bio-decomposition are well known. Also, any medical devices intended for implantation must be free of potentially harmful substances that could leach from the implant in vivo. Although problems of this sort can be readily identified, the solutions are not always immediately obvious as there is usually a complex relationship between the surface chemistry and molecular structural features of the polymers, their morphology, the fabrication process and the device design. To date, such inter-relationships are not well understood and, in most instances, evaluation studies have been based on ill-defined commercial polymers. Whilst some efforts have been made to tailor materials for improved end-use properties and to gain an understanding of their properties, little attention seems to have been directed to the precision manufacture of quantities of materials for specific biomedical applications, which exhibit controlled and consistent bulk and surface properties.

Polyurethanes are generally synthesised by the reaction between a multifunctional isocyanate, a polyol and a chain extender, the isocyanate reacting with the polyol to form a low molecular weight pre-polymer, which is converted to a higher molecular weight polymer by chain extension or cross-linking with a chain extender. For some applications requiring low molecular weight polyurethanes, however, it may not be necessary to use a chain extender. For most applications, however, a bifunctional or polyfunctional chain extender will be used to effect chain extension or cross-linking, respectively. Moreover, it is possible to vary the order of reaction of the various components, for example, such that the isocyanate is first reacted with only a portion of the polyol or the chain extender so as to send cap the latter, prior to reaction with the remainder of the polyol or chain extender. A range of isocyanates, polyols and chain extenders are available commercially, with different chemical structures, molecular weights and functionalities. Most isocyanates are usually polyfunctional aromatic, aliphatic or alicyclic compounds. A variety of different polyols are available and include hydroxy-terminated esters, ethers or carbonate diols of varying molecular weights, with varying levels of hydrophobicity, hydrophilicity and backbone modifications. A number of chain extenders are available, which are typically low molecular weight polyols polythiols or amines of varying functionality. The choice of isocyanate, polyol and chain extender is determined by the final application. Other reagents can be added to form active chain-end groups or modify the bulk and surface properties for a specific application. Clearly, the number of possible combinations of isocyanate, polyol, chain extender and additional modifiers, and the number of different types of polyurethanes that can be produced from these, is considerable. In contrast to polymers such as, for example, polyethylene or polypropylene, therefore, the polyurethanes represent an entire family of materials, of widely differing characteristics. Moreover, a range of physical, mechanical and chemical properties can be attained by adjusting the ratio of isocyanate, polyol and chain extender. The polyol, being longer and more flexible, is commonly referred to as the soft segment, and the isocyanate and chain extender units are referred to as the hard segment. Therefore, a polyurethane with a high hard segment content will be relatively hard and rigid, whereas a polyurethane with a low hard segment content will be relatively soft and flexible. These hard and soft segments are immiscible, and phase segregation occurs forming soft and hard segment domains. When molten, the polyurethane is phase-mixed, that is, the soft segment is interspersed with hard segment and view. When cooled to a solid, phase segregation will begin, the rate at which this occurs being determined by time and temperature. Several commercially available polyurethanes require annealing after melt processing to increase the rate of phase segregation and to attain their required mechanical and physical properties. For polyurethane elastomers, the presence of these discreet hard segment domains dispersed within the soft segment matrix acts like a reinforcing filler and is primarily responsible for their good mechanical properties. Aqueous polyurethanes, which can be used to form reticulated coatings of the kind described in British Patent No. 2,331,717 that are suitable for application to medical devices and other medical products such as catheters or surgical gloves, can be manufactured by the selection of a suitably hydrophilic soft segment. The molecular weight of the pre-polymer formed by reacting the isocyanate with the polyol is ultimately limited by the viscosity of the pre-polymer solution, with higher molecular weight pre-polymers resulting in more viscous solutions. Chain extension is carried out in the water phase and an internal emulsifier (part of the polyurethane backbone) or an external emulsifier is used to aid dispersion. A co-solvent is usually added before chain extension to reduce the viscosity of the reaction mixture and to aid subsequent film forming during water evaporation. Up until now, though, it has not been possible to produce aqueous polyurethanes from very high molecular weight pre-polymers owing to the physical constraints associated with handling reaction mixtures of such high viscosity.

Conventional methods for making polyurethanes include both one step and two step processes. The one step method involves concurrent mixing of isocyanate, polyol and chain extender either in a batch reactor, when a solvent is employed, or in a mould, in the case of bulk polymerisation. Using a solvent enables much better mixing and reaction control. However, extra cost is incurred as the solvent must be recovered at the end of the process, whilst its subsequent disposal may well present environmental difficulties. The two step method involves the manufacture of a pre-polymer in a first step, usually from isocyanate and one or more polyols, and then, in a second step, chain extension with a stoichiometric amount of isocyanate, polyol or chain extender, depending on how pre-polymer synthesis was carried out. The two step approach can be carried out in solution or in bulk, the latter necessitating the use of an appropriate delivery and mixing means, such as, for example, reaction injection moulding equipment. Reaction injection moulding (RIM) methods were specifically developed for the direct manufacture of polyurethane products by bulk polymerization in moulds and such methods have been extensively reviewed (see, for example, P D Coated, G R Davies, R A Duckett, A F Johnson and I M Ward, *Some Routes for Tailoring of Polymer Properties through Processing*, Trans IChemE, Vol. 73, Part A, September, 1995). Most RIM systems comprise pumps that are capable of independently delivering an isocyanate and polyol stream through some form of mixing device directly into a mould, where reaction takes place to form the final object, such as, for example, a shoe sole. Impingement mixing at a molecular level is generally achieved by forcing the different reagent streams through a mix-head under high velocity and pressure, such that vigorous mixing occurs instantaneously. The main advantages of RIM methods are the precision with which it is possible to control the stoichiometry of the co-reagents and the high degree of mixing of the reagents that can be achieved during the mould filling process. There are many different designs of RIM machines, the principal variations depending on whether they are intended to be capable of handling reinforcing agents in the fluid streams (RRIM), pumping the reagents over a pre-placed reinforcement in a mould (SRIM), operating at high temperatures, or simply handling low viscosity non-reinforced fluids. The first three systems have pumps that operate at high pressures (typically 150-200 bar), whilst systems for handling low viscosity non-reinforced fluids have pumps which operate at much lower pressures. A further distinction can be drawn between machines that employ self-cleaning impingement mix-heads and those with simpler mechanical mixing devices, such as mechanical stirrers, which require the removal of polymer residues between injections or after a series of injections, using a solvent or an air purge. Mechanical mixing devices are normally only employed in low pressure systems, which are well suited to the manufacture of low modulus products, such as polyurethane foams, using chemical or physical blowing methods. RRIM and SRIM methods demand the use of lance pumps and are generally used in conjunction with sophisticated self-cleaning mix-heads. Such methods are particularly well-suited to the manufacture of large surface-area composite products for the automobile industry, such as, for example, car body panels. However, there are significant problems associated with the use of such methods for making small, complex shaped or thick section products, of the kind often required in biomedical applications. Consequently, RIM and other conventional batch process methods are of limited interest for the manufacture of polyurethane biomedical devices, which require products of exceptional quality and reproducibility. Polyurethanes can also be manufactured in a continuous manner in an appropriately designed extruder reactor by reactive extrusion (REX). Isocyanate and polyol streams are usually fed to the extruder in stoichiometric amounts, in order to achieve steady-state flow conditions. The extruder performs many functions, including mixing of reagents and delivery of the reacting mass to a suitable die, usually a strand die, which allows pelletisation of the product for subsequent use in injection moulding or further extrusion processes. In addition, the physical and chemical properties of the resultant polyurethanes can be modified in the extruder, the most common types of modification being: grafting, where a relatively unreactive basic polymer is reacted with low molecular weight reagents to increase its activity; reactive blending, where the basic polymer is blended with one or more secondary polymers to form new block or graft co-polymers; degradation, where the basic polymer is degraded in a controlled manner, to form lower molecular weight polymers of desired processing characteristics; functionalisation, where specific chemical groups are grafted on to the surface of the basic polymer, to improve or alter its polarity, reactivity or surface activity; and cross-linking or chain extension, where the basic polymer is reacted with cross-linking agents or chain extenders to increase its molecular weight or viscosity. Like RIM, conventional REX methods have also been used for the manufacture of polyurethanes for biomedical applications, but have been found to be less than ideal because they do not give rise to materials having sufficiently reproducible properties. This may be due to a number of different factors, such as inadequate control of reaction stoichiometry, imperfect mixing, or poor temperature control. With many REX processes, for example, it is common practice to blend the pelletised product in silos, in order to remove any instantaneous variability in the materials so obtained. When the polyurethanes of conventional processes are subjected to a post-polymerisation extrusion-pelletisation process, additional thermal and mechanical stresses can cause further changes to take place, such as, for example, degradation of the polymer, which may significantly influence its inherent properties. Indeed, post-polymerization processing of polurethanes will always impart the character of the processing method on the final product, whether it be an injection moulding, coating, or extrusion process. In general, though, processing conditions can be better controlled than polymer synthesis and, thus, the removal of variability in the polymer synthesis stage is of considerable importance. It is an object of the present invention, therefore, to overcome some of the aforementioned disadvantages by providing a process for manufacturing polyurethanes with a high degree of precision and reproducibility.

SUMMARY OF INVENTION

Accordingly, in a first aspect of the invention, there is provided a process for making a polyurethane, comprising reacting a multifunctional isocyanate, a polyol and, optionally, a chain extender, wherein at least two reagents selected from the isocyanate, the polyol, the chain extender, any mixture thereof and any pre-polymer formed therefrom, are intensively mixed prior to being reactively extruded, to form a polyurethane having a predetermined stoichiometry and thermal history. In the context of the present invention, the term "polyurethane" is understood to include any polymer which contains multiple urethane linkages and includes, for example, polyurethane-ureas. In an embodiment, at least a portion of the polyol or the chain extender is reacted with the isocyanate prior to intensive mixing, so as to "end cap" the polyol or the chain extruder with isocyanate groups, thus facilitating subsequent reaction. In another embodiment, at least a portion of the isocyanate is reacted with the polyol or the chain extender prior to intensive mixing. Preferably, at least a portion of the chain extender is mixed with the polyol prior to intensive mixing. Advantageously, the process according to the present invention allows absolute control of reagent stoichiometry, whilst intimate mixing of the reagents at the molecular level allows the manufacture of tailored linear polyurethanes of narrow molecular weight distribution or narrow polydispersity. Moreover, a known and reproducible thermal history can be imparted to the polymer during synthesis, whilst overall thermal degradation can be minimised by reducing the number of melt cycles for polyurethane components. Such a process allows the integrated manufacture of a polyurethane resin, finished product or aqueous dispersion, whilst perturbations of the reaction stoichiometry allows the manufacture of polyurethanes with controlled composition and mass distributions, not possible by conventional synthetic techniques.

The multifunctional isocyanate may be any suitable aromatic, aliphatic or cycloaliphatic polyisocyanate, but is most preferably an organic diisocyanate. Preferred organic diisocyanates include 4,4'-diisocyanatodiphenylmethane, 2,4-'diisocyanatodiphenylmethane, isophorone diisocyanate, p-phenylene diisocyanate, 2,6-toluene diisocyanate, polyphenyl polymethylene polyisocyanate, 1,3-bis(isocyanatomethyl)cyclohexane, 1,4-diisocyanatocyclohexane, 1,6-hexamethylene diisocyanate, 1,5-naphthalene diisocyanate, 3,3'-dimethyl-4,4'-biphenyl diisocyanate, 4,4'-diisocyanatodicyclohexylmethane, 2,4'-disocyanatodicyclohexylmethane, and 2,4-toluene diisocyanate, or combinations thereof. The polyol may be any suitable polyhydroxy compound, but is generally a hydroxy-terminated ester, ether or carbonate diol. Preferred polyalkylene ether glycols include polyethylene ether glycols, poly-1,2-propylene ether glycols, polytetramethylene ether glycols, poly-1,2-dimethylethylene ether glycols, poly-1,2-butylene ether glycol, and polydecamethylene ether glycols. Preferred polyester polyols include polybutylene adipate and polyethylene terephthalate. Preferred polycarbonate diols include polytetramethylene carbonate diol, polypentamethylene carbonate diol, polyhexamethylene carbonate diol, polyhexane-1,6-carbonate diol and poly[1,6-hexyl-1,2-ethyl carbonate]diol. However, many other suitable polyhydroxy compounds can also be used depending upon the desired application. The polymerisation reaction may be carried out in the presence of an activating amount of a suitable catalyst, for example, an organotin catalyst such as stannous octanoate. However, the presence of a catalyst is not usually necessary, due at least in part to the efficiency of the intensive mixing step, or even desirable, depending upon the intended application of the polyurethane, such as, for example, in implantable devices. For some applications, the multifunctional isocyanate and polyol are not reacted with a chain extender. In most cases, however, a chain extender will be included to effect chain extension or crosslinking of the urethane-linked pre-polymer as it forms. Any suitable polyol, polythiol or polyamine or mixture thereof that is suitable for this purpose may be used, such as, for example, mixed diols comprising a 2,4-dialkyl-1,5-pentanediol and a 2,2-diallyl-1,3-propanediol. Specific examples of 2,4-dialkyl-1,5-pentanediol include 2,4-dimethyl-1,5-pentanediol, 2-ethyl-4-methyl-1,5-pentanediol, 2-methyl-4-propyl-1,5-pentanediol, 2,4-diethyl-1,5-pentanediol, 2-ethyl-4-propyl-1,5-pentanediol, 2,4-dipropyl-1,5-pentanediol, 2-isopropyl-4-methyl-1,5-pentanediol, 2-ethyl-4-isopropyl-1,5-pentanediol, 2,4-diisopropyl-1,5-pentanediol, 2-isopropyl-4-propyl-1,5-pentanediol, 2,4-dibutyl-1,5-pentanediol, 2,4-dipentyl-1,5-pentanediol, 2,4-dihexyl-1,5-pentanediol, and the like. Specific examples of 2,2-dialkyl-1,3-propanediol include 2,2-dipentyl-1,3-propanediol, 2,2-dihexyl-1,3-propanediol and the like. Especially preferred chain extenders include 1,4-butanediol, 1,2-ethylene diamine, hydrazine and triethylamine. However, many other suitable classes of polyols and amines are known to those skilled in the art are also included within the ambit of the invention. In the context of the present invention, the phrase "intensively mixed" generally means that the two or more reagents selected from the isocyanate, the polyol, the chain extender, any mixture thereof and any pre-polymer formed therefrom, are intimately mixed at the molecular level. In a preferred embodiment, the two or more reagents are intensively mixed by vortexing, such that two or more reagent streams are caused to coincide and flow together in a spiral fashion. In another embodiment, the two or more reagents are intensively mixed in a swash plate pump or a gear pump. Most preferably, the two or more reagents are intensively mixed via a reactive injection processing technique, of the kind used in conventional RIM or SRIM processes. In a preferred embodiment, the synthesis technique of the current invention utilises an impingement mixing head, similar to those used in a RIM machine, and fitted with two or more reagent streams. Each different stream can be programmed to deliver the required amount of reagent continuously and with high accuracy not associated with current RIM or REX techniques. Moreover, as the reagents are intensively mixed at a molecular level, the reaction generally starts spontaneously, thereby avoiding the need for inclusion of reaction catalysts altogether or greatly reducing the amounts of such catalysts required. Since many of the catalysts normally used in such reactions are potentially highly toxic in vivo, the inventive process is particularly suitable for making polyurethane medical devices intended for implantation. The mix-head is preferably self-cleaning, to avoid having to clean the apparatus after each used. In an embodiment, the two or more reagents are delivered to the mix-head under pressure, preferably via one or more injection lances. For example, a first injection lance may contain isocyanate and a second injection lance may contain polyol and chain extender, or a first injection lance may contain a first isocyanate, a second injection lance may contain a second isocyanate mixed with an aliquot of a first polyol to effect end-capping, a third injection lance may contain a second polyol and a fourth injection lance may contain a chain extender. There are clearly many possible combinations and permutations of the various reagents and all of these combinations are intended to be included within the scope of the present invention. The relative amounts of the two or more reagents being supplied to undergo intensive mixing may remain the same during the course of the reaction. Alternatively, the relative amounts of the reagents and, hence, the stoichiometry may be perturbed during the course of the reaction, such that the composition of the resultant polymer can be carefully controlled in order to obtain the desired composition, molar mass and sequence distribution. Preferably, the mixing step is substantially instantaneous, most preferably occurring within a time period of fraction of a second to a few seconds at most. It is especially desirable that the resultant mixture is substantially homogeneous immediately after mixing, although the subsequent composition of the mixture will obviously change as polymerisation proceeds. In the context of the present invention, the term "reactively extruded" is understood to mean that the physical and chemical properties of the polyurethane mixture are modified in a continuous flow stirred tank reactor (CSTR) or an extruder, preferably by at least one of the various forms of modification described above in relation to conventional REX procedures. In a further embodiment, the resultant mixture is fed directly into an extruder, the latter preferably being close coupled to the mix-head. In this last named embodiment, the extruder may be immediately adjacent to and is, preferably, directly connected to the mix-head, such that the resultant polyurethane pre-polymer mixture exiting the mix-head passes straight into the extruder. In an alternative and especially preferred embodiment, the resultant mixture is fed into an extruder via a rheometer, a densitometer, a spectrophotometer or any combination thereof. This permits an instantaneous "snapshot" of the viscosity, density or composition of the reaction mixture to be taken before the reactive extrusion process begins and allows for any adjustments thereto to be made. In a further embodiment, the resultant mixture is fed into the extruder via a reaction chamber, preferably, a stirred reaction chamber, to allow further polymerization reactions to occur. Preferably, the mixture is fed into the extruder at a rate of 0.01-25 kg/s, preferably 0.1-10 g/s, and most preferably 1-5 kg/s. The role of the extruder is essentially two fold. Firstly, the temperature of sections along the length of the extruder can be controlled, thereby controlling reaction temperature, which in turn dictates the progress of the polymerisation reaction. Secondly, as polymerisation reactions are taking place in the extruder, additional reagents can be introduced at the extruder and can participate in the polymerisation reaction to give modified polyurethanes of specific value, such as polyurethanes where the end group is different from the groups within the polymer chain. For example, a chain extender can be mixed with the pre-polymer at this stage, to promote chain extension or cross-linking and increase viscosity and molecular weight. Sensors can be placed along the length of the extruder barrel to monitor the reaction as it progresses, whilst temperature control means can be used to ensure that the reaction processes occur within defined temperature ranges. In a preferred embodiment, therefore, the polyurethane can be made to undergo thermal profiling during the reactive extrusion process, such that it has a well-defined thermal history. In an especially preferred embodiment, the extruder also comprises a rheometer, a densitometer, a spectrophotometer or any combination thereof at a pre-determined point along its length or at its exit, such that the physical and chemical properties of the forming polymer and the final polyurethane can be closely monitored and, if necessary, adjusted during the reactive extrusion process. Therefore, dynamic control of the reagent stoichiometry and intimate mixing of the reagents coupled with a controlled thermal profile reduces the batch to batch property variation. Preferably, the reaction stoichiometry can be controlled within 0.01-2%, preferably within 0.05-1%, and most preferably within 0.1-0.2%. Equally preferably, the thermal profile of the resultant polyurethane can be controlled within 0.01-2° C., preferably within 0.05-1° C., and most preferably within 0.1-0.5° C. In an especially preferred embodiment, the rate of mixing of the two or more reagents, the rate of feed of the resultant mixture to the extruder, and the residency time and temperature profile of the polyurethane mixture in the extruder is controlled automatically, preferably by computer means. The output from the extruder can be fed through an appropriate die to form the finished product, fed directly into an injection moulding machine, fed into a pelletiser, or fed into a system that allows the dispersion of the melt into water, thus forming an aqueous polyurethane dispersion. One advantage of dispersing directly into water is that a higher molecular weight polyurethane can be dispersed and chain extended, resulting in a higher molecular weight polyurethane. Reducing the number of processing steps helps to reduce the thermal degradation of the polyurethane, which can result in a reduction in the molecular mass of the polyurethane and a deterioration in the consistency of the bulk and surface chemistry. An important feature of the inventive process is that the reacted polyurethane can be extruded directly into the final form, such as, for example, tubing, dispersed in water to produce an aqueous polyurethane dispersion, pelletised for further processing by injection moulding or extrusion, or directly injection moulded.

In a second aspect of the invention, there is provided an apparatus for making a polyurethane comprising: a delivery system for quantitatively dispensing at least two reagents selected from an isocyanate, a polyol, a chain extender, any mixture thereof and any pre-polymer formed therefrom; mixing means for intensively mixing said at least two reagents; and reactive extrusion means. In a preferred embodiment, the delivery system comprises one or more injection lances, preferably controlled by the use of linear transducers. In an especially preferred embodiment, the delivery system and mixing means are essentially as described in relation to FIG. 3 of the article by P. D. Coates, G. R. Davies, R. A. Duckett, A. F. Johnson and I. M. Ward, *Some Routes for Tailoring of Polymer Properties Through Processing*, Trans IChemE, Vol 73, Part A, September 1995, except that the material exiting the post-mix-head CSTR (Continuous Flow Stirred Tube Reactor) or rheometer is fed directly into the reactive extrusion means instead of a mould. In a further embodiment, the reactive extrusion means comprises a barrel extruder, preferably having one or more entry ports for introduction of various reagents. Preferably, the reactive extrusion means is a twin screw extruder, most preferably a co-rotating twin screw extruder. Any commercially available twin screw extruder may be used, such as an APV Baker MP2030 with a 30 mm screw diameter (L:D=40/1; D=30 mm) co-rotating twin screws and sixteen heating zones, which is available from APV Baker, Speedwell Road, Parkhouse East, Newcastle-under-Lyme, United Kingdom. In a further embodiment, the extruder is provided with at least one thermocouple, to monitor the temperature of extruded material in the immediate vicinity of the thermocouple. In a further embodiment, the extruder is provided with temperature regulating means, to control the temperature of the extruded material in the region adjacent thereto. In another embodiment, the apparatus further comprises measurement means adapted to measure a physical or chemical parameter or property of the polyurethane mixture. Preferably, the measurement means comprise a rheometer, a densitometer, a spectrophotometer or any combination thereof. In an embodiment, the measurement means is located between the mixing means and the reactive extrusion means, so as to enable an instantaneous assessment of the properties of the polyurethane or pre-polymer mixture to be made, prior to reactive extrusion. In another embodiment, the apparatus also comprises at least one measurement means within or at the exit of the reactive extrusion means to monitor the properties of the polyurethane mixture and the final polymer. In an especially preferred embodiment, the apparatus further comprises: means for controlling the rate at which the delivery means dispenses said at least two reagents in response to a first control signal; means for controlling the rate at which the resultant mixture is fed to the reactive extrusion means in response to a second control signal; means for controlling the temperature of the polyurethane mixture in the reactive extrusion means in response to a third control signal; means for detecting a property of the polyurethane mixture during reactive extrusion and being adapted to generate a detector signal; and a processor adapted to generate said first, second and third control signals in response to said detector signal. This enables the inventive process to be automated and any necessary adjustments required to produce a polyurethane of well defined or pre-determined stoichiometry and thermal history to be accurately controlled. In this last mentioned embodiment, the control and detection means are preferably programmable means, such that their operation can be controlled by a program run on a computer.

In a third aspect of the invention, there is provided a computer program which, when run on a computer, causes an apparatus according to the invention in its second aspect to operate a process according to the invention in its first aspect.

BRIEF DESCRIPTION OF THE DRAWINGS

In order that the invention may be more fully understood, an embodiment thereof will now be described, by way of illustration only, and with reference to the accompanying drawings, wherein.

DETAILED DESCRIPTION

Figure 1:
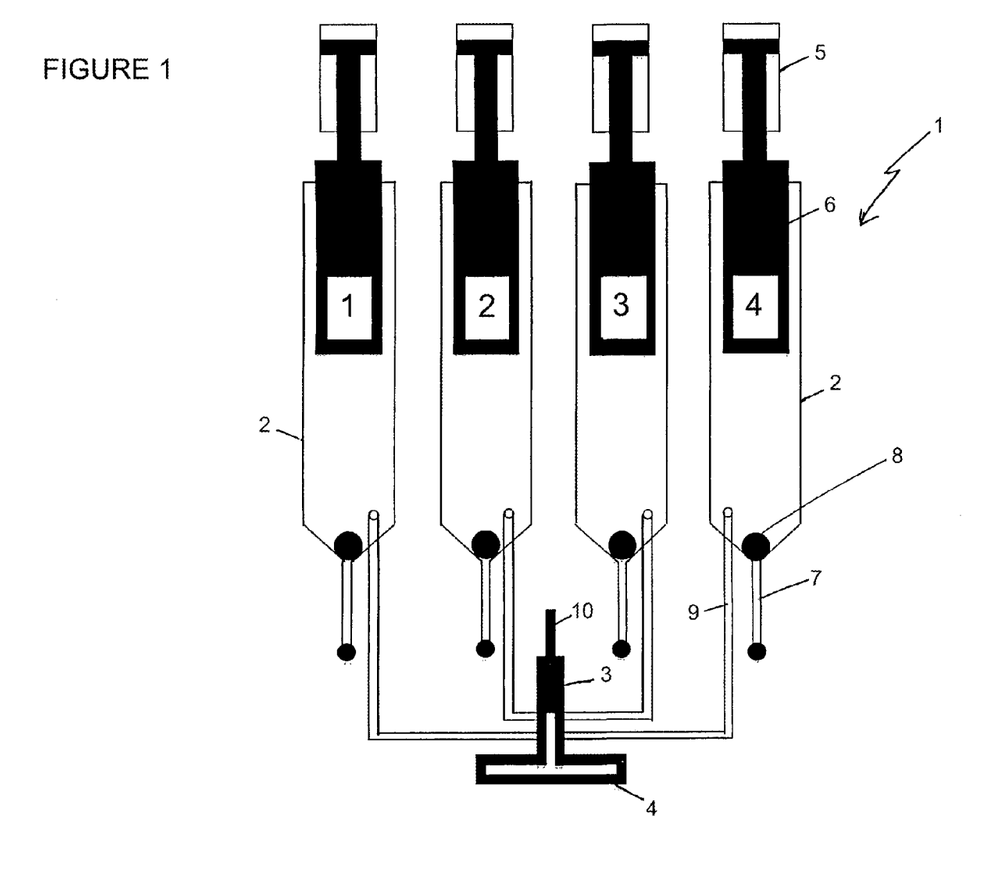
FIG. 1 shows a front view of a conventional reactive injection moulding apparatus with four injection lances.
Figure 2:
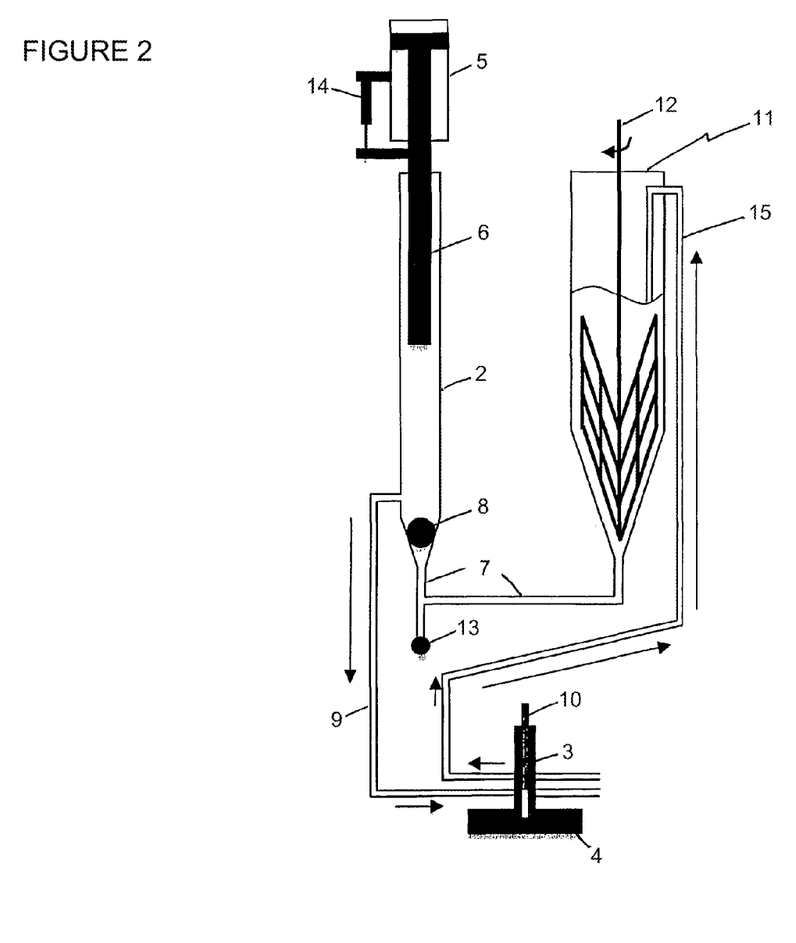
FIG. 2 shows a side view of one of the injection lances of the apparatus shown in FIG. 1.

In FIG. 1, a conventional reactive injection moulding apparatus 1 comprises four injection lances 2, a four reagent stream mix-head 3 and a mould 4. Each lance 2 is numbered for ease of identification and comprises a hydraulic cylinder 5, a lance pump 6, an inlet pipe 7, a non-return valve 8 and an outlet pipe 9. The mix-head 3 is so adapted that both pairs of reagent streams from the four outlet pipes 9 directly oppose each other. The mix-head 3 comprises a cylindrical mix-pin 10 having four vertical grooves (not shown) that are inscribed into the surface of the cylinder at equal intervals and run along ⅜ of its length from the mid-point to within an 1/s of its length from the bottom face of the pin 10. In FIG. 2, each lance 2 is supplied with reagent from mix-tank 11, which is stirred by a paddle stirrer 12. Reagent is supplied to lance 2 via inlet pipe 7, passing through non-return valve 8. Inlet pipe 7 is fitted with a vent 13. Reagent is drawn from mix-tank 11 into lance 2 by raising lance pump 6 and subsequently ejected from lance 2 by depression of lance pump 6 through the action of hydraulic cylinder 5 controlled by means of a linear transducer 14. Reagent is supplied to mix-head 3 via outlet pipes 9. When mix-pin 10 is fully inserted in mix-head 3, the grooves align with the outlet pipes 9 to provide channels to the return pipes 15, such that the reagent streams are recycled to mix-tanks 11, without being able to enter mould 4. When mix-pin 10 is retracted so that its lower face sits between outlet pipes 9 and return pipes 15, the reagents are impingement mixed before passing into mould 4. When mould 4 is full, mix-pin 10 is again fully inserted allowing excess reagents to be recycled to mix-tanks 11 via return pipes 15.

Figure 3:
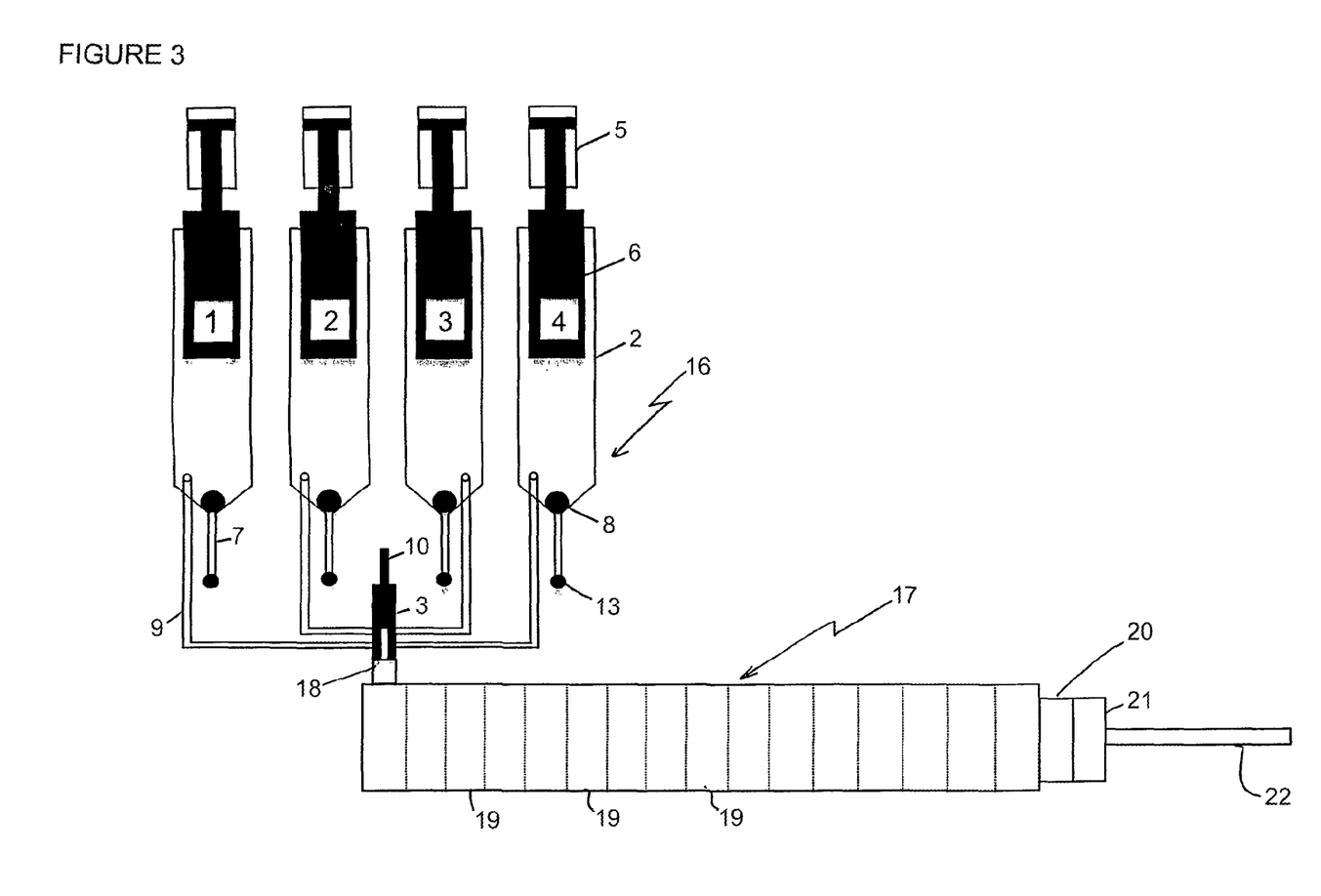
FIG. 3 shows a front view of an apparatus according to the present invention.

In FIG. 3, a Precision Polyurethane Manufacture (PM) apparatus according to the invention 16 comprises four injection lances 2, a mix-head 3, and an APV Baker MP 2030 twin screw extruder 17. Extruder 17, which is joined to mix-head 3 via a rheometer 18, has a 30 mm screw diameter (L:D=40/1; D=30 mm) co-rotating twin screws (not shown), sixteen programmable heating zones 19, a second rheometer 20 and a die 21. However, alternative forms of extruders having different dimensions, different numbers of programmable zones, different measurement means, and different screw arrangements could also be used, depending upon the intended application. When mix-pin 10 is retracted, mixed reagents from mix-head 3 pass via rheometer 18 into extruder 17. Reaction mixture passes through each of heating zones 19, which are programmed to maintain the mixture at a predetermined temperature, before exiting extruder 17 via a second rheometer 20 through a die 21 to give the extruded polymer 22. One or both of the rheometers 18, 20 could be replaced or combined with a densitometer or a spectrophotometer, so as to measure other physical or chemical parameters of the polymeric material.

In a typical run, the mix-tanks are pre-heated to the required temperature and then charged with the required amount of reagents, as determined by the stoichiometry, sequence distribution requirements and length of production run required. The reagents are continuously stirred by paddle stirrers under nitrogen until homogenous and at constant temperature. A "dry" run is carried out (where the mix-head pin is not retracted) under the required reaction conditions, that is, stream mix-ratios, mix-volume and mix-time. The pressure of each stream is monitored during this run. The pressure in each stream can be balanced if necessary by adjustment of a needle valve behind the mix-head orifice (not shown). Balancing the pressure of each stream is essential, as it facilitates good mixing as well as preventing the reaction from taking place in the supply lines, which will occur if the pressure of one stream is significantly greater than the other streams, thereby filling the stream feed line. The reagents in each tank are circulated using the lances, with the lances drawing the reagents from the holding tank and ejecting them around the circuit and back into the holding tank. When ready to run, the control software is launched. The size (volume) of each lance is programmed into the software, and can be changed if required. Several pieces of information are requested by the software, namely: streams to be used, mix-volume, mix-time, and mix-ratio. The "streams to be used" information activates the required lances. The mix-volume is the total amount of product required at the end of the run, with the maximum volume being the sum of the selected stream volumes. The mix-time determines the time that the mix-pin is retracted and the velocity of the lances. The mix ratio determines the ratio of the velocities of the lances. From this information, the software calculates the required dispensing requirements. For example, using the following parameters for 2 lances of equal size, 1 L mix-volume, 4 seconds mix-time and a mix-ratio of 1:1, 0.5 L from each stream is mixed over a period of 4 seconds. If a mix-ratio of 3:1 were required, 0.75 L of the first stream would be impingement mixed with 0.25 L of the second stream (with the velocity of the first stream being three times that of the second stream). The software becomes invaluable when using more streams of different sizes and different mix-ratios. The position of each lance is measured with the linear transducer. After the above information is entered into the software, the contents of the lances are ejected and the "empty" reading from the transducers taken. The lances are then filled completely, and the "full" reading taken. The PPM equipment is ready to run. When instructed, the lances begin to eject reagents into the respective transfer lines. The velocity of each lance is monitored by the software and when constant, the mix-pin is retracted allowing impingement mixing of the reagents in the mix-head. The mixed reagents undergo rapid polymerisation reactions as they pass from the mix-head into the close coupled, twin screw extruder via an in-line rheometer. The reacting mixture passes through the extruder in a pre-determined time and follows a pre-determined thermal profile dictated by the combination of the running speed of the extruder and the temperature settings of each of the sixteen temperature zones. An in-line rheometer is fitted at the output end of the extruder to give real time measurement of rheological properties which are used as a signal to control aspects of the operation of the process, such as extruder speed, temperatures of the extruder zones, lance speed, stoichiometry, reagent temperature, in accordance with an algorithm operated by a computer, to give real time control of the rheological properties of the polyurethane. The polymerised polyurethane melt exits from the extruder via a conventional strand die to form continuous strands of polyurethane which is then cooled and pelletised in the conventional way. Continuous operation of the process is achieved by allowing the reagent streams to work in an asynchronous manner with one set of streams filling while another set is ejecting to the mix-head and vice versa. The polyurethane melt exiting the extruder may also be formed into a final component (such as tubing or film) by passing the material through a suitable die, or the melt can be injection moulded directly into a suitable mould to give a final component. Modification of the choice of reagents and stoichiometry allows the polyurethane melt to be dispersed into water to give a polyurethane dispersion.

The invention claimed is:

1. A process for making a polyurethane, comprising:
reacting reagents comprising a multifunctional isocyanate, a polyol and a chain extender, wherein the reagents are from separate sources and first contact one another when the reagents are intensively mixed by intimately mixing the reagents at a molecular level to form a uniform mixture prior to being introduced into an extruder, wherein said reagents are intensively mixed via a reactive injection technique, the intensive mixing occurs substantially instantaneously, the resultant mixture from said intensive mixing is substantially homogeneous immediately after mixing and the resultant mixture from said intensive mixing is fed directly into an extruder; and
extruding the mixture into a mold to form a polyurethane having a predetermined stoichiometry distribution and thermal history,
wherein the relative amount of the reagents to be intensively mixed is perturbed during the process prior to intensively mixing the reagents to change the relative amount of the reagents in the mixture, and the intensively mixing of the reagents is at a degree such that the predetermined stoichiometry distribution of the polyurethane is controlled by the perturbation.

2. A process as claimed in claim 1, wherein the reaction is carried out in the absence of a catalyst.

3. A process as claimed in claim 1, wherein the resultant mixture from said intensive mixing is fed into the extruder at a rate of 0.01-25 kg/s.

4. A process as claimed in claim 1, wherein a mixture from said intensive mixing undergoes thermal profiling while being reactively extruded.

5. A process as claimed in claim 1, wherein a mixture from said intensive mixing is reacted with a chain extender while being reactively extruded.

6. A process as claimed in claim 1, wherein a mixture from said intensive mixing is blended with at least one other polymer while being reactively extruded.

7. A process as claimed in claim 1, wherein a mixture from said intensive mixing is reacted or treated with a modifying agent while being reactively extruded, to modify physical or chemical properties of the polyurethane.

8. A process as claimed in claim 1, wherein a rate of mixing of said reagents, a rate at which the resultant mixture from said intensive mixing is fed to an extruder, and a residency time and temperature of the resultant mixture in the extruder is controlled automatically.

9. A process as claimed in claim 1, wherein the reaction stoichiometry can be controlled within 0.01-2%.

10. A process as claimed in claim 1, wherein the thermal history of the resultant polyurethane can be controlled within 0.01-2 C.

* * * * *